United States Patent

[11] 3,632,387

[72] Inventor Judith E. Sutherland
 Stamford, Conn.
[21] Appl. No. 795,366
[22] Filed Jan. 30, 1969
[45] Patented Jan. 4, 1972
[73] Assignee American Cyanamid Company
 Stamford, Conn.

[54] POROUS TEFLON HAVING GRAFTED POLYMER LAYERS ON THE WALLS OF THE PORES AND ON OTHER SURFACES
 10 Claims, No Drawings
[52] U.S. Cl. .................................................... 117/47 A,
 117/98, 117/118, 117/138.8 UF
[51] Int. Cl. ................................................... B44d 1/092
[50] Field of Search ....................................... 117/47 A,
 93.31, 138.8 UF, 98, 118; 204/159.2

[56] References Cited
UNITED STATES PATENTS
| | | | |
|---|---|---|---|
| 3,101,275 | 8/1963 | Cairns et al. .................. | 117/47 |
| 2,773,781 | 12/1956 | Rodman ....................... | 117/138.8 |
| 3,290,415 | 12/1966 | Tanner ......................... | 117/47 |

Primary Examiner—William D. Martin
Assistant Examiner—M. Sofocleous
Attorney—James H. Laughlin, Jr.

ABSTRACT: An improved polyhalogenated ethylene product which may have a grafted polymer on its surface, and a process for lining the internal pores of the polyhalogenated ethylene product is given whereby the polyhalogenated ethylene product is pretreated with a surface active agent, followed by etching which renders the surface and internal pores receptive to grafting. This base may then be impregnated with a monomer and subjected to grafting reactions which form the improved polyhalogenated product which may be used as a membrane, nonreactive tubing or cannula and the like.

POROUS TEFLON HAVING GRAFTED POLYMER LAYERS ON THE WALLS OF THE PORES AND ON OTHER SURFACES

The present invention relates to an improved polyhalogenated ethylene product. More particularly, it relates to an improved porous polyhalogenated ethylene product having selective chemical characteristics on its internal surface. Further, this invention is concerned with a procedure for lining the internal pores of the polyhalogenated ethylene materials with selective polymers so that the pore surface characteristics can be selected from a group having acidic, basic, complexing, hydrophilic, or other special properties.

Porous polyhalogenated ethylene has many commercial uses. Porous polytetrafluoroethylene, for example, may be employed as a matrix for an electrode or catalytic material, for plastic tubing or cannulla, or as material for filtering. If in the porous polytetrafluoroethylene or other polyhalogenated product, the internal surfaces of the pores are subjected to polymer grafting with selected polymers, the usefulness of this material can be extended to those applications where ion selectivity is desirable. However, the method for grafting polymers to the surfaces of nonporous polytetrafluoroethylene is only effective on the outer surface when employed with porous material. Thus inner pore surfaces are not treated by prior art grafting methods.

It is, therefore, an object of this invention to provide a method useful in modifying the internal surface of porous plastics and more particularly porous polyhalogenated ethylene. It is an additional object to provide ion selective surfaces for membranes which are acceptable for use in the desalination of water and purification of other solutions. Other objects and advantages of this invention will become apparent from a consideration of the ensuing description.

It is well known that the grafting of a variety of selective monomers such as, for example, acrylic acid, methacrylic acid, itaconic acid, maleic acid, crotonic acids, vinyl sulfonic acid, as well as esters thereof, such as methyl acrylate, methyl methacrylate, t-butyl acrylate, t-butyl crotonate, sec-butyl acrylate, isobutyl acrylate, isobutyl methacrylate, vinyl acetate, vinyl crotonate and various equivalents thereof, including monomethyl styrene will impart to the surface of the plastic member sufficient negative charges which are integral with the member's surface and therefore are not readily removed. According to the processes of the prior art, a suitable plastic member can be permanently modified so as to impart negative ion charges on its surface. This is accomplished by subjecting the plastic member such as polyhalogenated ethylene to ionizing radiation in the presence of a sufficient amount of monomer which upon hydrolysis will contain a carboxyl or other active group. Subsequent to the grafting operation, the grafted polymer is subjected to chemical treatment such as hydrolysis, preferably by treatment with suitable alkali or acid, or both.

It has been unexpectedly found that porous plastic members can be modified in a simple and straightforward manner by pretreating the porous plastic base which may be a polyhalogenated ethylene like polytetrafluoroethylene with a surface active agent so as to make possible the etching of the internal surfaces of the pores preliminary to the grafting step to confer the special properties.

In the procedures previously used to graft special characteristic polymers onto the surface of porous polytetrafluoroethylene, for example, the object is dipped into the etching solution without pretreatment and thus only the outer surface of the porous polytetrafluoroethylene and not the inner surfaces of the pores are treated. Thus resulting chemical properties of the final plastic product are less desirable.

The novel procedure of this invention, however, makes it possible to line the pores with polymers. Additionally, a broader choice of monomers can be selected for grafting so as to provide the internal surfaces with special chemical characteristics. These include acidic, basic, complexing, hydrophilic and other special properties which can be achieved as desired by the selection of a proper monomer, such as, for example, vinyl monomers and dienes among others.

Typically, a porous polytetrafluoroethylene material or other base is extracted with hexane and dried. It is then impregnated with a small amount of from 0.001 to 10 percent, but more preferably, from 0.01 to 2 percent, aqueous solution of a surface active agent, such as 1,4-bis(2-ethylhexyl)sodium sulfosuccinate, n-dioctylsodium sulfosuccinate, octylphenoxypolyethoxyethanol, sodium dihexylsulfosuccinate, stearamido-propyl-dimethyl-$\beta$-hydroxyethylammonium phosphate, or other surface active agent and carefully dried. The drying is very critical here as any water retained in the pores or on the surface will be harmful to the etching treatment subsequent. This treated base is etched using a polytetrafluoroethylene or other select polymer etching preparation, such as, for example, sodium naphthalate or potassium dissolved in liquid ammonia. The etched material which has both its surface and pore area etched, is then impregnated with a monomer selected from the group consisting of glacial acrylic acid, styrene, methacrylic acid, t-butylaminoethyl methacrylate, vinyl stearate, other vinyl monomers, dienes, and other usual grafting monomers, containing 0.001 to 2 percent, but more preferably from about 0.01 to about 1 percent, by weight, of benzoin, and 0.001 to 2 percent, more preferably from about 0.01 to about 1 percent by weight lauroyl peroxide. The preparation is then exposed to a grafting reaction such as, for example, radiation for a period of from about a minute to approximately 10 hours, but more preferably from a range of from about 3 to about 300 minutes. Following the grafting step, ungrafted homopolymer is extracted from the final product.

The grafting reaction or polymerization of the monomeric material hereinabove defined can be initiated by a free radical initiation such as that initiated by azobisisobutyronitrile or benzoyl peroxide. Heat, ultraviolet light, visible light, X-rays or ionizing radiation which requires a dose ranging from about 1 to about 5 megarads, along with other known means may also be employed.

To optimize the success of the grafting procedure, it is a good practice prior to effecting polymerization of the monomer to cleanse the plastic base thoroughly by means of a suitable degreasing solvent such as ethyl acetate.

The resulting graft polymer may subsequently be subjected to a variety of chemical reactions, such as hydrolysis, alcoholysis, ester interchange, sulfonation, chlorosulfonation, carboxylation, chlorocarboxylmethylation, chloromethylation or esterification.

The following examples will illustrate the novel surface characteristics of the plastic members of this invention. These are merely to be taken as illustrative and are not to be taken as limitative of the invention. Unless otherwise stated, all parts are by weight.

EXAMPLE 1

Porous polytetrafluoroethylene material is extracted with refluxing acetone and dried. The material is wetted with a 0.01 to 2 percent aqueous solution of Aerosol-OT which is 1,4-bis-(2-ethylhexyl)sodium sulfosuccinate and is carefully dried. This treated material is etched using sodium naphthalate in ether. The etched material is washed first with butanol and then with water until the dark color of the filtrate is removed. The porous polytetrafluoroethylene after etching is brown on the outside surfaces of the material and the internal surfaces of the pores. After treatment, water will pass through the pores showing that the internal surfaces of the pores have been etched and are hydrophilic.

EXAMPLE 2

Example 1 was repeated using an aqueous solution of octylphenoxypolyethoxyethanol surface active agent instead of Aerosol OT. Examination of the material of the final product showed that the treated surfaces of the pores had been etched.

EXAMPLE 3

Example 1 was repeated using sodium dioctylsulfosuccinate surface active agent replacing Aerosol OT. Upon washing the final product when examined showed the internal surfaces had been treated by the etching solution.

EXAMPLE 4

Example 1 was again repeated using stearamidopropyl-dimethyl-β-hydroxyethylammonium phosphate surface active agent replacing again the Aerosol OT. Examination of the material showed that the internal surfaces of the pores had been etched.

EXAMPLE 5

Example 1 was again repeated using sodium dihexylsulfosuccinate surface active agent. An examination of the material showed again that the internal surfaces had been etched and water readily passed through the pores indicating that the internal surfaces were now hydrophilic.

EXAMPLE 6

Example 1 was repeated using no surface active agent at all. The porous polytetrafluoroethylene material following etching was brown and not shown to be hydrophilic. Water would not pass through the pores after this treatment, thus indicating that the characteristics of the untreated polytetrafluoroethylene surface were much different than those of the treated surface-active agent surface.

EXAMPLE 7

Example 1 was repeated using polytetrafluoroethylene powder which had a particle size of from 10 to 100 microns in place of the porous membrane material. Following treatment, the material was brown and very wetted by water.

EXAMPLE 8

Example 1 was repeated. The etched material was then impregnated with glacial acrylic acid containing 0.01 to 1 percent by weight lauroyl peroxide and 0.01 to 1 percent by weight benzoin. The preparation was then exposed to ultraviolet radiation for about 3 minutes. Homopolymer of acrylic acid was then extracted with water and the final product was shown to be smooth and had improved surface characteristics.

EXAMPLE 9

Example 3 was repeated and the procedure of example 8 was followed except that the preparation was subjected to radiation for about 300 minutes. After the remaining homopolymer was extracted, the resulting product was shown to be smooth and demonstrated improved surface characteristics.

I claim:

1. A process for preparing a polyhalogenated ethylene base bearing a permanently grafted polymer on its surface and within its internal porous surfaces which comprises:

impregnating the polyhalogenated ethylene base having internal porous surfaces with an aqueous solution of a surface active agent;

drying the polyhalogenated ethylene base to remove all the water therein;

etching the polyhalogenated ethylene base; and subjecting the etched base to a grafting reaction in the presence of a polymerizable monomer which permanently grafts onto the surface and within the internal porous surfaces of the halogenated ethylene base.

2. The process according to claim 1 wherein the surface active agent is 1,4-Bis(2-ethylhexyl) sodium sulfosuccinate.

3. The process according to claim 1 wherein the surface active agent is n-dioctylsodium sulfosuccinate.

4. The process according to claim 1 wherein the surface active agent is octylphenoxypolyethoxyethanol.

5. The process according to claim 1 wherein the surface active agent is sodium dihexylsulfosuccinate.

6. The process according to claim 1 wherein the surface active agent is stearamido-propyl-dimethyl-β-hydroxyethyl-ammonium phosphate.

7. The process according to claim 1 wherein the polyhalogenated ethylene base is polytetrafluoroethylene.

8. The process according to claim 7 wherein the polymerizable monomer is methylmethacrylate.

9. The process according to claim 7 wherein the polymerizable monomer is acrylic acid.

10. The process according to claim 7 wherein the surface active agent is n-dioctylsodium sulfosuccinate.

* * * * *